(12) United States Patent
Walker (10) Patent No.: US 8,595,447 B2
(45) Date of Patent: Nov. 26, 2013

(54) COMMUNICATION BETWEEN INTERNAL AND EXTERNAL PROCESSORS

(75) Inventor: Robert Walker, Raleigh, NC (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 13/561,922

(22) Filed: Jul. 30, 2012

(65) Prior Publication Data

US 2012/0290814 A1 Nov. 15, 2012

Related U.S. Application Data

(63) Continuation of application No. 12/478,465, filed on Jun. 4, 2009, now Pat. No. 8,234,460.

(51) Int. Cl.
*G06F 12/00* (2006.01)

(52) U.S. Cl.
USPC .......................................................... 711/147

(58) Field of Classification Search
None
See application file for complete search history.

(56) References Cited

U.S. PATENT DOCUMENTS

| | | | |
|---|---|---|---|
| 6,141,722 A * | 10/2000 | Parsons .............................. | 711/2 |
| 7,167,890 B2 | 1/2007 | Lin et al. | |
| 7,917,729 B2 | 3/2011 | Georgiou et al. | |
| 8,234,460 B2 | 7/2012 | Walker | |
| 2006/0236059 A1 * | 10/2006 | Fleming et al. ............... | 711/170 |
| 2007/0239966 A1 | 10/2007 | Georgiou et al. | |
| 2010/0077157 A1 | 3/2010 | Gregorius et al. | |
| 2010/0312944 A1 | 12/2010 | Walker | |
| 2010/0312997 A1 | 12/2010 | Walker | |
| 2010/0312998 A1 | 12/2010 | Walker | |
| 2010/0312999 A1 | 12/2010 | Walker | |
| 2010/0313000 A1 | 12/2010 | Walker | |
| 2011/0093662 A1 | 4/2011 | Walker et al. | |
| 2011/0093665 A1 | 4/2011 | Walker et al. | |

FOREIGN PATENT DOCUMENTS

EP 1231543 8/2002

OTHER PUBLICATIONS

Wessam Hassanein et al.; Data Forwarding Through In-Memory Precomputation Threads; Dec. 31, 2003; XP002595282; Retrieved from the Internet Aug. 4, 2010; p. 3; fig 1.
Manuel E. Acacio, et al.; An Architecture for High-Performance Scalable Shared-Memory Multiprocessors Exploiting On-Chip Integration; IEEE Transactions on Parallel and Distributed Systems, vol. 15, No. 8, Aug. 31, 2004, pp. 755-768, XP002595283.
Office Action and Translation mailed Jun. 6, 2013 in Taiwan Application No. 099118251.

* cited by examiner

*Primary Examiner* — Hiep Nguyen
(74) *Attorney, Agent, or Firm* — Fletcher Yoder (57) ABSTRACT

Systems, methods of operating a memory device, and methods of arbitrating access to a memory array in a memory device having an internal processor are provided. In one or more embodiments, conflicts in accessing the memory array are reduced by interfacing an external processor, such as a memory controller, with the internal processor, which could be an embedded ALU, through a control interface. The external processor can control access to the memory array, and the internal processor can send signals to the external processor to request access to the memory array. The signals may also request a particular bank in the memory array. In different embodiments, the external processor and the internal processor communicate via the control interface or a standard memory interface to grant access to the memory array, or to a particular bank in the memory array, for example.

24 Claims, 4 Drawing Sheets

COMMUNICATION BETWEEN INTERNAL AND EXTERNAL PROCESSORS

CROSS-REFERENCE TO RELATED APPLICATION

This application is a continuation of U.S. patent application Ser. No. 12/478,465, which was filed on Jun. 4, 2009, now U.S. Pat. No. 8,234,460, which issued on Jul. 31, 2012.

BACKGROUND

1. Field of Invention

Embodiments of the invention relate generally to memory systems, and more particularly, to memory systems having internal and external processors.

2. Description of Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light and not as admissions of prior art.

Electronic systems typically include one or more processors, which may retrieve and execute instructions, and output the results of the executed instruction, such as to store the results to a suitable location. A processor generally includes arithmetic logic unit (ALU) circuitry, which is capable of executing instructions such as arithmetic and logic operations on one or more operands. For example, the ALU circuitry may add, subtract, multiply, or divide one operand from another, or may subject one or more operands to logic operations, such as AND, OR, XOR, and NOT logic functions. The various arithmetic and logic operations may have different degrees of complexity. For example, some operations may be executed by inputting the operand(s) through the ALU circuitry in one cycle, while other operations may utilize multiple clock cycles.

A number of elements in the electronic system may be involved in directing a set of instructions to the ALU for execution. For example, the instructions and any corresponding data (e.g., the operands on which the operations will be executed) may be generated by a controller, or some other suitable processor in the electronic system. As the time or number of clock cycles required for the execution of a set of instructions may vary depending on the type of operation, the controller may write the instructions and data to memory, for example, a memory array, and the ALU may retrieve the information (e.g., the instructions and/or corresponding data) to execute the instructions. Once the ALU has executed an instruction, the results of the executed instruction may be stored back in the memory array.

In some memory systems, the memory array may be external to the ALU. Thus, an external bus may be employed to input the instructions and data from a memory array to an ALU, and to output the completed results back to the memory array or another suitable output. Such external input/outputs may increase power consumption in the system. In other memory systems, a processor may be configured in the same package or embedded on the same silicon chip as a memory component, and may be referred to as a processor-in-memory (PIM). For example, one or more ALUs may be embedded on the same chip as a memory array or with the memory array in the same package, which may eliminate the need for an external bus to transfer information between the memory array and the ALU to conserve power in the electronic device. However, in a PIM system, more than one processor may require access to the memory array. For example, an external processor may write instructions to the memory array, and an internal processor (e.g., the ALU) may read instructions from the memory array; further, the ALU may write the results of the instructions to the memory array, and the external processor may read or control the output of the results from the memory array. As more than one processor may require access to the memory array, conflicts may occur.

BRIEF DESCRIPTION OF DRAWINGS

Certain embodiments are described in the following detailed description and in reference to the drawings in which.

DETAILED DESCRIPTION

Arithmetic logic unit (ALU) circuitry is generally used to process instructions in multiple stages. Processing the instructions may include executing the instructions, and storing the results of the executed instructions. More specifically, instructions, and the data on which the instructions will be executed, may be sent by a controller to the ALU, and may first be stored in a memory device to be retrieved when the ALU circuitry is available to execute the instructions. Once the instructions have been executed, the ALU may write the results of the operation to a memory component, or to any other suitable output.

In one or more embodiments of the present techniques, one or more processors, such as one or more ALUs, may be packaged with or embedded on a memory device. Such processors are hereinafter referred to as "internal processors." For example, the memory device may be a processor-in-memory (PIM), and may include embedded ALUs and a memory array, which may store instructions and data to be processed by the ALUs and the results from the completed instructions. In other embodiments, the ALUs and the memory array may be on unique dies in the same package. For example, the ALUs and the memory array may be arranged in a multi-chip package (MCP), and may be electrically connected by a through-silicon via (TSV).

The memory device may include additional elements such as a sequencer to organize the instructions to be executed by the ALU, and a buffer to hold the instructions and/or data before the instructions are executed, and/or to hold results of the results. As discussed, power may be consumed during the input of data or instructions from a memory register to an ALU and the output of the results from the ALU to the memory register. When the ALU is external to the memory register, an external input/output (I/O) may be required. However, an external I/O may consume a significant amount of power from the memory system. For example, the high power consumption of an external I/O may be disadvantageous in a battery-run mobile electronic device, or in any electronic device operating on a power supply.

One embodiment of the present technique involves a memory device having a memory component and an internal processor, such as a compute engine having one or more ALUs. The memory device may be a PIM with a compute engine, or the compute engine may be packaged with the memory component in a MCP. For example, in the PIM embodiment, the compute engine is embedded on the memory device, and no external bus may be required to transmit information between the compute engine and the memory array. More specifically, instructions and/or data may be transmitted from the memory array to the compute engine without being routed outside the memory device. Similarly, results of completed operations may also be transmitted from the compute engine to the memory array within the memory device. A compute engine and a memory array included in the same memory device may eliminate the need for an external I/O between the two elements, and may reduce power consumption for the electronic system.

In a traditional electronic system, an external processor, such as an integrated or discrete memory controller that is external to the memory device, may be the only device to access the array on the memory device. When other processors in the electronic system require information from the memory device, the requests may be sent to the memory controller. As the memory controller is the sole component accessing the memory array, no collisions may arise from simultaneous accesses. In an electronic system where processors, such as ALUs, are connected to the memory components in a memory device, the ALUs may internally access the array on the memory device. For example, the ALUs may access the memory array to retrieve the information necessary to execute its instructions. However, collisions may occur when two different devices, such as the external memory controller and the internal ALUs, are accessing the memory simultaneously.

One or more of the present techniques disclose systems and methods of arbitrating access to the memory array by enabling communication between the external processor(s), here a memory controller, and the internal processor(s), here ALUs. In some embodiments, the memory controller and the ALUs may be electrically connected by a control interface. The control interface may enable the ALU to send request signals to the memory controller to request access to the memory array. Likewise, the memory controller may send grant signals through the control interface to the ALU to grant access to the memory array. In some embodiments, the ALU may send a request signal specifying a particular bank in the memory array, and the memory controller may grant access to a particular bank based on the availability of the banks in the array. Different embodiments of the present techniques also include granting access to the memory array based on the sequence of incoming grant requests from the ALU or other devices in the electronic system also requiring access to the memory array. Furthermore, the grant signals may be sent through a standard memory interface, which may reduce the complexity or the number of pins on the control interface. In embodiments, the direct communication between the ALUs and the memory controller regarding access to a memory array may reduce collisions resulting from the simultaneous access of the memory array.

Several of the terms used above may be used throughout the present disclosure, and definitions of such terms are provided to facilitate a better understanding of the present techniques. A "memory device" may include memory, such as dynamic random access memory (DRAM) or synchronous dynamic random access memory (SDRAM) embedded on an integrated circuit chip or board, for example. One or more processors, such as ALUs or circuitry suitable for performing instructions in an electronic system, for example, may also be included with the memory device. For example, the processors (e.g., ALUs) may be embedded on, or packaged with the memory device. A processor(s) that is embedded on or packaged in the memory device may also be referred to as an "internal processor." An "external processor" may refer to a discrete memory controller or a processor with an integrated memory controller that is external to a package including a memory device (e.g., not embedded on or packaged with the memory device). The memory controller may send "instructions," which refer to the task to be performed or executed by the ALUs. For example, instructions may include arithmetic or logic operations, or any other task which an ALU or other processor may be suitable for executing. Instructions may sometimes require more than one "cycle," or more than one pass through one or more ALUs, before the instruction has been executed. "Operands" may refer to the data on which operations are performed, and depending on the instruction, one or more operands may be input into the ALU circuitry at the same time. Additionally, in some operations, an operand may be input through an ALU in one cycle, and carried out of the ALU and back into the ALU as an operand for an additional subsequent cycle(s).

As used herein, an "interface" may refer to an electrical connection between the memory device and the memory controller. In some embodiments, one type of interface may directly connect the ALUs, embedded on or otherwise packaged with the memory device, to the memory controller. "Request signals" and/or "grant signals" may be transmitted through different types of interfaces between the memory device and the memory controller. Request signals may be sent by the ALU to the memory controller to request access to the memory array, such as to a particular block in the memory array. Grant signals may be sent by the memory controller to the ALU to allow the ALU to access the memory array, such as to a particular block in the memory array.

Figure 1:
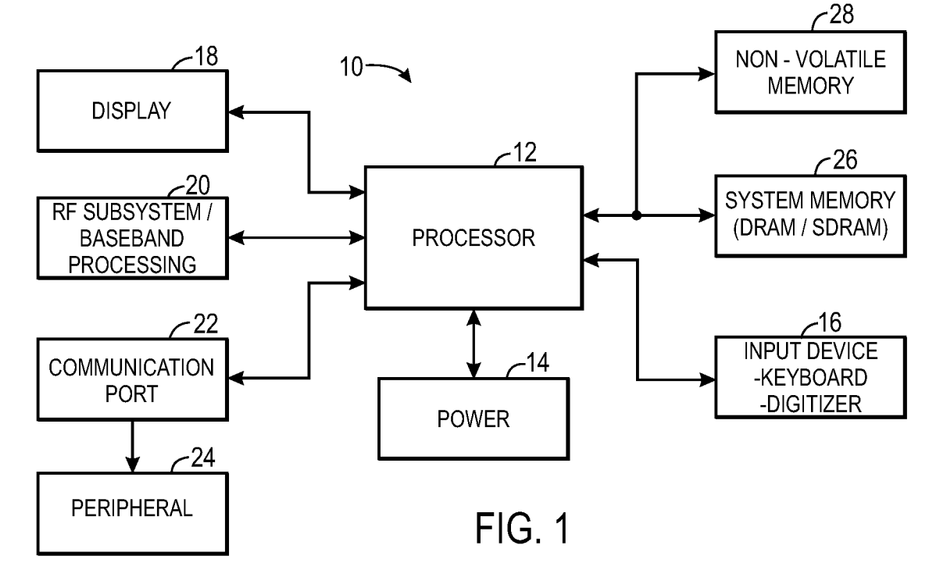
FIG. 1 depicts a block diagram of a processor-based system in accordance with an embodiment of the present technique.

Now turning to the figures, FIG. 1 depicts a processor-based system, generally designated by reference numeral 10. As is explained below, the system 10 may include various electronic devices manufactured in accordance with embodiments of the present technique. The system 10 may be any of a variety of types such as a computer, pager, cellular phone, personal organizer, control circuit, etc. In a typical processor-based system, one or more processors 12, such as a microprocessor, control the processing of system functions and requests in the system 10. As is explained below, the processor 12 and other subcomponents of the system 10 may include resistive memory devices manufactured in accordance with one or more embodiments of the present technique.

The system 10 typically includes a power supply 14. For instance, if the system 10 is a portable system, the power supply 14 may advantageously include a fuel cell, a power scavenging device, permanent batteries, replaceable batteries, and/or rechargeable batteries. The power supply 14 may also include an AC adapter, so the system 10 may be plugged into a wall outlet, for instance. The power supply 14 may also include a DC adapter such that the system 10 may be plugged into a vehicle cigarette lighter, for instance.

Various other devices may be coupled to the processor 12 depending on the functions that the system 10 performs. For instance, an input device 16 may be coupled to the processor 12. The input device 16 may include buttons, switches, a keyboard, a light pen, a mouse, a digitizer and stylus, and/or a voice recognition system, for instance. A display 18 may also be coupled to the processor 12. The input device 16 and/or the display 18 may each or both form a user interface. The display 18 may include an LCD, an SED display, a CRT display, a DLP display, a plasma display, an OLED display, LEDs, and/or an audio display, for example. Furthermore, an RF sub-system/baseband processor 20 may also be coupled to the processor 12. The RF sub-system/baseband processor 20 may include an antenna that is coupled to an RF receiver and to an RF transmitter (not shown). One or more communication ports 22 may also be coupled to the processor 12. The communication port 22 may be adapted to be coupled to one or more peripheral devices 24 such as a modem, a printer, a computer, or to a network, such as a local area network, remote area network, intranet, or the Internet, for instance.

The processor 12 generally controls the system 10 by processing software programs stored in the memory. The software programs may include an operating system, database software, drafting software, word processing software, and/or video, photo, or sound editing software, for example. The memory is operably coupled to the processor 12 to store and facilitate execution of various programs. For instance, the processor 12 may be coupled to the system memory 26 which may include dynamic random access memory (DRAM), and/or synchronous dynamic random access memory (SDRAM). In one embodiment, the processor 12 may include an integrated memory controller or be a discrete memory controller, as previously discussed, which may be capable of communicating with a memory device in the system memory 26. Also as discussed, a memory device in the system memory 26 may include memory arrays (e.g., a DRAM array or an SDRAM array), and may be packaged with an internal processor, such as an embedded ALU or ALUs. Further, the system memory 26 may include volatile memory, non-volatile memory, or a combination thereof, and is typically large so that it can store dynamically loaded instructions and data.

The processor 12 may also be coupled to non-volatile memory 28, which is not to suggest that system memory 26 is necessarily volatile. The non-volatile memory 28 may include read-only memory (ROM), such as an EPROM, resistive read-only memory (RROM), and/or flash memory to be used in conjunction with the system memory 26. The size of the ROM is typically selected to be just large enough to store any necessary operating system, application programs, and fixed data. Additionally, the non-volatile memory 28 may include a high capacity memory such as a tape or disk drive memory, such as a hybrid-drive including resistive memory or other types of non-volatile solid-state memory, for instance.

One or more embodiments of the present techniques involve the communication between the processor 12 and components of the system memory 26. More specifically, the processor 12 may include a general purpose processor, a central processing unit, a processor core, an ASIC, a memory controller, and/or an ALU, for example, capable of sending and receiving signals from internal processors packaged with (e.g., embedded on) memory devices in the system memory 26. As illustrated in the block diagram of FIG. 2, a memory system 100 may include a memory controller 102, which may be in a system-on-a-chip (SOC) with a more general purpose to collectively form a processor 12 of a processor-controlled system 10 (as in FIG. 1), for example. The memory controller 102 may control certain elements of a memory device 104, which may be part of the system memory 26 of the system 10.

Figure 2:
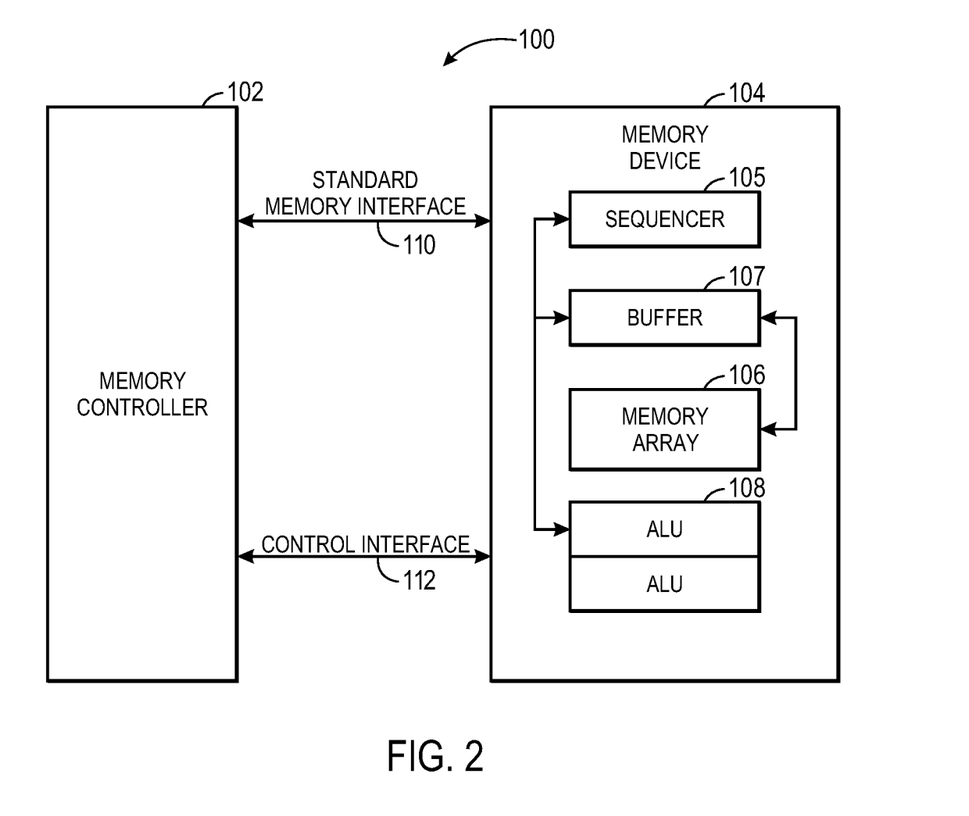
FIG. 2 depicts a block diagram of a memory system with internal arithmetic logic units (ALUs) interfaced with a memory controller, in accordance with an embodiment of the present technique.

The memory device 104 may include a memory array 106 and include or otherwise be packaged with one or more internal processors, such as arithmetic logic units (ALUs) 108. The memory array 106 may refer to any suitable form of storage, and may include, for example, a DRAM array or an SDRAM array. Access to the memory array 106 may be substantially controlled by the memory controller 102. As will be later discussed, in some embodiments, access to the memory array 106 may also be substantially controlled by the ALU 108. The ALU 108 may refer to one or more ALUs, which may be capable of executing instructions sent from another processor (e.g., the memory controller 102), including, for example, arithmetic operations such as addition, subtraction, multiplication, and division, and logic functions such as AND, OR, XOR, and NOT functions. The ALU 108 may be embedded on, or otherwise packaged with the memory device 104, and capable of accessing the memory array 106. Further, the memory device 104 may include a sequencer 105 and a buffer 107. The sequencer 105 may organize the instructions sent from the memory controller 102, and the buffer 107 may store operands and/or results of the operations before they are transferred to the memory array 106. The sequencer 105 may also be configured to communicate with the memory controller 102.

The memory controller 102 and the memory device 104 may be electrically connected by a standard memory interface 110 which enables data transfer between the memory controller 102 and components of the memory device 104. For example, the memory controller 102 may write data or instructions to the memory array 106 in the memory device 104 via the standard memory interface 110. Further, in some embodiments of the present techniques, the memory controller 102 may send signals and/or commands directly to the sequencer 105 or the ALU 108 via the standard memory interface 110 to grant the ALU 108 and/or the sequencer 105 access to the memory array 106. In one or more embodiments, the types of standard memory interface 110 may include DDR, DDR2, DDR3, LPDDR, or LPDDR2, for example.

While a standard memory interface 110 may be configured to transfer signals between the memory controller 102 and the memory device 104, in accordance with one or more of the present techniques, an additional interface(s) may be configured to also transfer commands (e.g., requests, grants, instructions) from the memory device 104 to the memory controller 102. In some embodiments, the memory controller 102 and the memory device 104 may also be electrically connected by a control interface 112, which may allow the ALU 108 and/or the sequencer 105 to send commands to the memory controller 102. As will be discussed, the commands sent via the control interface 112 to the memory controller 102 may request access to the memory array 106. In one or more embodiments, the memory controller 102 may also send signals to the ALU 108 and/or the sequencer 105 via the control interface 112 to grant the ALU 108 access to the memory array 106.

As discussed, an electronic system may include multiple processors, possibly associated with multiple devices, requiring access to memory arrays in the system. To prevent collisions from simultaneous accesses of the memory arrays, typical systems generally arbitrate access to a memory array by funneling all requests to access through one processor. In one or more embodiments of the present techniques, one or more ALUs 108 may be internal to a memory device 104 with a memory array 106. Memory devices 104 with internal ALUs 108 may reduce power consumption by eliminating the need for external I/Os between the ALUs 108 and the memory array 106. However, direct access of the memory array 106 by an internal ALU 108 may result in data collisions.

While traditional systems arbitrate memory array access amongst one or more external devices, embodiments of the present technique may include arbitrating memory array access between external processors (e.g., the memory controller 102) and internal processors (e.g., the ALUs 108). The arbitration of memory array access between external and internal processors may be implemented by enabling communication between the ALU 108 and the memory controller 102 through the control interface 112 and/or the standard memory interface 110. Different embodiments of such techniques may be explained through the diagrams illustrated in FIGS. 3-6 and may refer back to the memory system 100 of FIG. 2.

Figure 3:
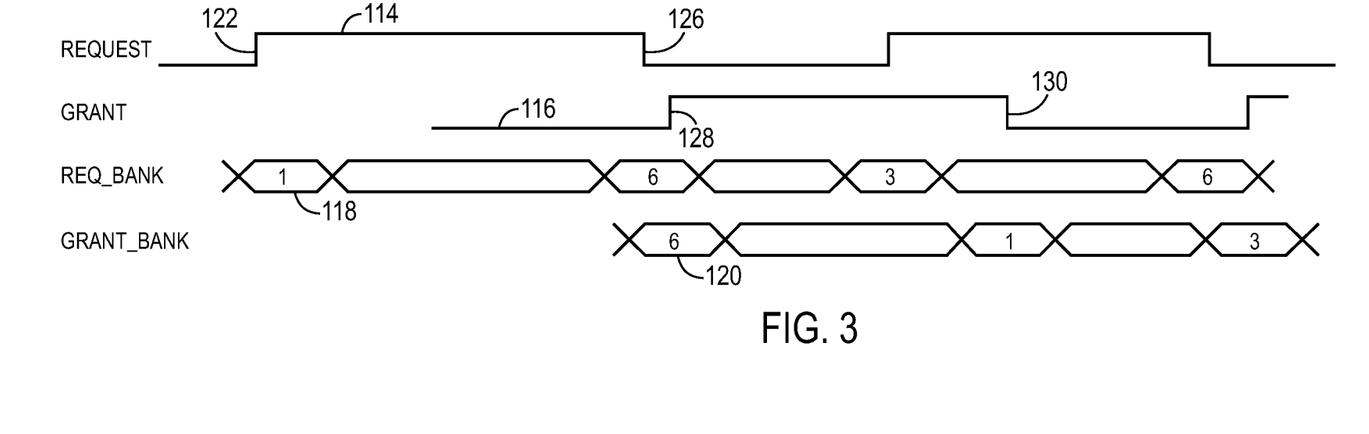
FIG. 3 illustrates a relationship between request and grant signals directed by the ALU and the memory controller, and the corresponding request and grant banks, in accordance with one or more embodiments of the present technique.

The diagram of FIG. 3 represents the timing and methodology between request signals 114 and 118 sent from the ALU 108 to the memory controller 102 and the grant signals 116 and 120 sent from the memory controller 102 to the ALU 108, in accordance with one embodiment of the present techniques. Access to the memory array 106 may be arbitrated by the external processor, such as the memory controller 102, even with an internal processor, e.g., the ALUs 108, packaged in or embedded on the memory device 104. When the ALUs 108 request access to the memory array 106, the ALUs 108 may send a signal to the external memory controller 102 via a control interface 112. The signal may indicate that the ALU 108 is requesting access to the memory array 106, and may also indicate a particular bank in the memory array 106 to which the ALU 108 requests access. A typical memory array 106 may include a number of banks. For example, some embodiments may include 4-16 banks.

In the diagram of FIG. 3, the first rising edge (or the first "toggle") 122 of the request line 114 indicates that the ALU 108 is requesting access to the memory array 106. As used herein, a "toggle" refers to a transition of the signal state from high-to-low, or low-to-high. The corresponding number in the request bank 118 indicates the particular bank to which the ALU 108 is requesting access. For example, at the first toggle 122, bank 1 in the memory array 106 is the targeted bank. In this diagram, toggling the request line 114 may indicate that the ALU 108 is requesting access to another bank in the memory array 106. For example, at the next toggle 126 of the request line 114, the request bank 118 may indicate that bank 6 is targeted.

The memory controller 102 may also communicate with the ALU 108 on the memory device 104 via the control interface 112 by granting access to a particular bank in the memory array 106. As the memory controller 102 controls access to the memory array 106, the memory controller 102 may know the availability of the banks in the array 106, and may grant access to particular banks based on their availability. For example, as illustrated in the grant line 116 of the diagram, the first toggle 128 of the grant line 116 indicates that the memory controller 102 is granting the ALU access to the memory array. The grant bank 120 indicates the particular bank in the memory array 106 to which the memory controller 102 is granting access. Each toggle in the grant line 116 may indicate that the memory controller 102 is granting access to a different bank in the memory array 106 based on the particular requests from the ALU 108. For example, at the next toggle 130 of the request line 116, the memory controller 102 may be granting access to bank 1 of the memory array.

Grants may not always immediately follow requests to access particular banks in the memory array 106. For example, though the first bank requested is bank 1, and the second bank requested is bank 6, access to bank 6 is granted before access to bank 1. The order of grants from the memory controller 102 may be based on the availability of banks in the memory array 106, rather than on the order of received requests. One reason why a grant to a particular bank may not immediately follow a request to the bank may be because the requested bank is unavailable. For example, other devices external to the memory device 104 may also request access to the memory array 106 from the memory controller 102. However, rather than waiting for the requested bank to become available, the memory controller 102 may continue to receive request signals from the ALU 108, and may grant access to a bank that is available. Thus, one embodiment of sending request and grant signals indicating a targeted or allowed bank may allow the memory controller 102 to grant banks out of order, increasing the flexibility and efficiency in scheduling bank accesses.

Figure 4:
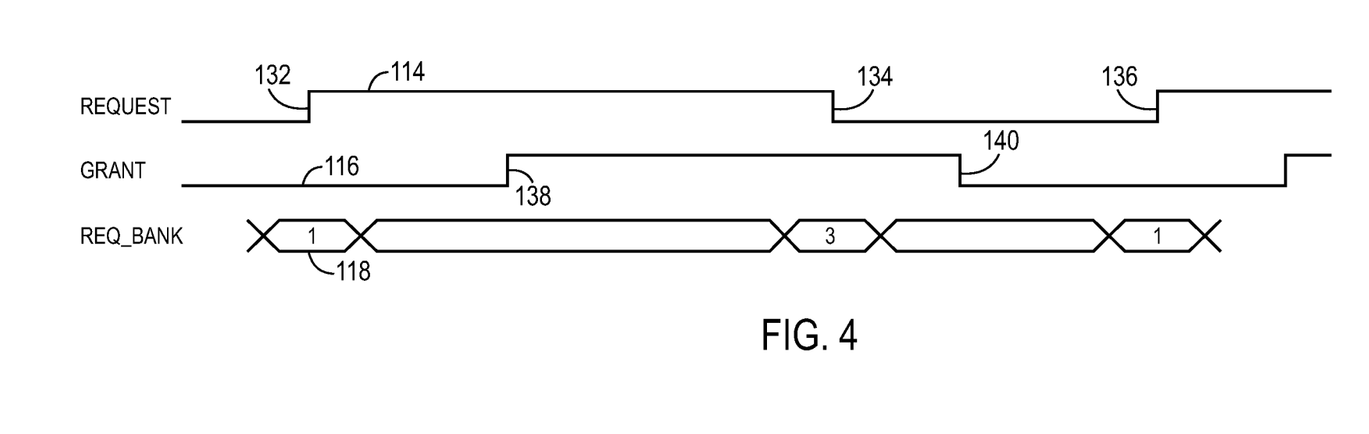
FIG. 4 illustrates a relationship between request and grant signals directed by the ALU and the memory controller, and a request bank indicator, in accordance with one or more embodiments of the present technique.

Another embodiment of the present techniques, arbitrating access to a memory array 106 in a memory device 104, may be explained through the timing diagram of FIG. 4. In one embodiment, the ALU 108 may send a signal via the control interface 112 to the memory controller 102, requesting access to a particular bank in the memory array 106. The memory controller 102 may grant the request to the bank based on the order the banks were requested. For example, at the first toggle 132 of the request line 114, the ALU 108 is requesting bank 1, as indicated by the request bank 118. The memory controller 102 may send a grant signal 116 through the control interface 112 to the ALU to grant access to a bank in the memory array 102.

Some embodiments may not include a grant bank, or may not otherwise explicitly indicate to the ALU 108 to which bank the memory controller 102 is granting access. Because a bank is not indicated, grants may be given based on the order of the requested banks. Thus, the toggle 138 of the grant signal 116 may follow the first request 132 to grant access to bank 1. At the next toggle 134, the ALU 108 is requesting bank 3, and the toggle 140 in the grant signal 116 may indicate that the memory controller 102 is granting access to bank 3. Further, at the third toggle 136 of the request line, the corresponding bank in the request bank 118 is bank 1. Since bank 1 has already been requested and granted, the third toggle 136 for bank 1 may indicate that the ALU 108 has completed the access of bank 1. Thus, the grant line 116 may not toggle, as no request is being made.

Depending on the complexity of the request and grant process, some embodiments may be more flexible than others. For example, the embodiment depicted in FIG. 3 may have greater flexibility than the embodiment depicted in FIG. 4, as the grant bank 120 may enable the memory controller 102 to grant bank accesses out of order from the requested banks. However, an embodiment without a grant bank, as in FIG. 4, may be simpler to implement, and may require fewer pins in the memory system 100.

Figure 5:
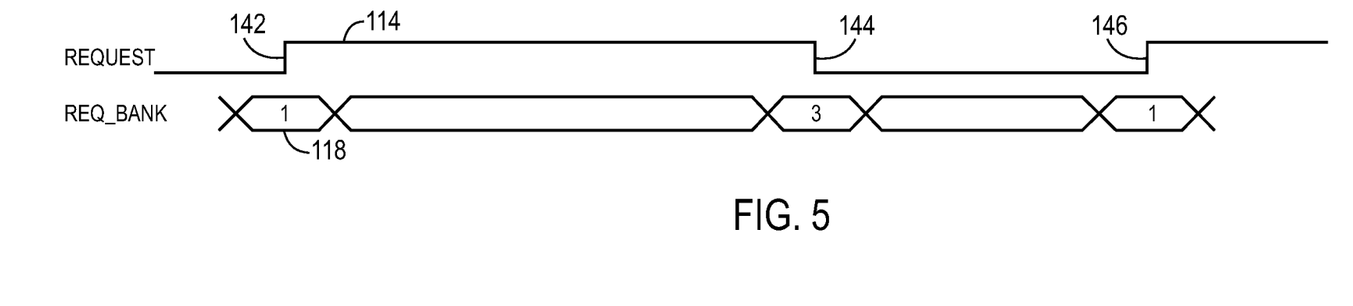
FIG. 5 illustrates a request signal directed by the ALU, based on the request bank monitored by the memory controller, in accordance with one or more embodiments of the present technique.

A method of arbitrating access to a memory array 106 by sending a signal via a control interface 112 to request access to a particular bank in the memory array 106 may be explained in the diagram of FIG. 5. While the ALU 108 may communicate through the control interface 112 to request bank access, the memory controller 102 may communicate through a standard memory interface 110 to grant access to the memory array 106. A request from the ALU 108 may be represented by the first toggle 142 of the request line 114 for access to bank 1, as indicated by the request bank 118, and request for access to bank 3 may be represented by the second toggle 144 of the request line 114. The third toggle 146 may represent a release of bank 1. As bank 1 was previously requested, the second time the request line 114 toggles on bank 1 may indicate that the ALU 108 has completed accessing bank 1 in the memory array 106. By using the standard memory interface 110 in addition to a simplified control interface 112 for communication between the ALU 108 and the memory controller 102, one embodiment may conserve bits on the control interface 112.

Figure 6:
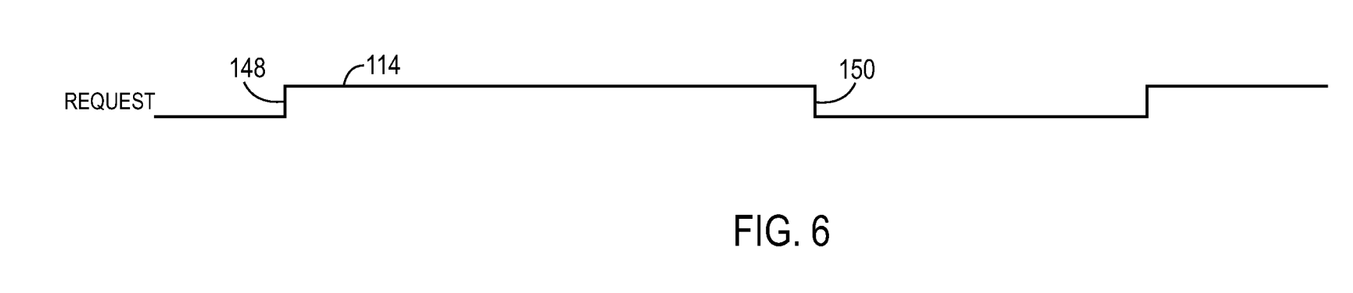
FIG. 6 illustrates a request signal directed by the ALU to the memory controller, in accordance with one or more embodiments of the present technique.

Another embodiment of arbitrating access to a memory array 106 which may also conserve space in the memory system 100 may be depicted in the diagram of FIG. 6. An ALU 108 may send a signal through a control interface to a memory controller 102 to request access to a memory array 106. The signal may indicate that the ALU 108 is requesting access to the entire array 106, as opposed to a particular bank in the array (See FIGS. 3-5). As seen in the diagram of FIG. 6, the request signal sent from the ALU 108 to the memory controller 102 may simply toggle (at 148 and 150) each time the ALU 108 requests access to the memory array 106. The memory controller 102 may grant requests for access through a standard memory interface 110. This embodiment may provide a simpler control interface 112, as the signal sent from the ALU 108 to the memory controller may not indicate a particular bank in the array 106. This embodiment may further save space on the control interface 112 by directing communication (i.e., granting access to the memory array 106) from the memory controller 102 to the ALU 108 through the standard memory interface 112.

While the disclosure provides examples of arbitrating access to a memory array 106 by requesting access from a memory controller 102 which substantially controls access to the memory array 106, the present techniques also include systems and methods of memory array arbitration where an internal processor substantially controls access to the memory array 106. For example, in one embodiment, the ALU 108 may control access to the memory array 106, and other devices may request access to the memory array 106 by sending request signals to the ALU 108. Similar to the described embodiments with respect to FIGS. 3-6, the ALU 108 may grant requests based on the availability of the memory array 106, the availability of a particular bank in the memory array 106, or the order of received request signals. In another embodiment, systems and methods of arbitrating access to a memory array 106 may be controlled by either the memory controller 102 or the ALU 108. The processor that controls access to the memory array 106 may change, and may be based on a particular application or process that is being performed.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A memory device comprising:
an internal processor;
a memory array accessible by the internal processor; and
an interface operably coupled to the internal processor and configured to allow the internal processor to communicate with an external processor, wherein the external processor comprises a memory controller configured to control access to the memory array.

2. The memory device, as set forth in claim 1, wherein the internal processor is configured to provide request signals to the external processor to access the memory array of the memory device.

3. The memory device, as set forth in claim 2, wherein the request signals comprise an indicator of a bank on the memory array requested by the internal processor and a request to access the bank by the internal processor.

4. The memory device, as set forth in claim 1, wherein the internal processor is configured to receive grant signals from the external processor via the interface to access the memory array of the memory device.

5. The memory device, as set forth in claim 1, wherein the internal processor is an Arithmetic Logic Unit (ALU) configured to provide request signals to the external processor to access the memory array of the memory device.

6. The memory device, as set forth in claim 1, wherein the internal processor is an Arithmetic Logic Unit (ALU) configured to communicate with the external processor by receiving a grant signal through the interface.

7. The method, as set forth in claim 1, wherein the memory device comprises a sequencer configured to organize the operations to be performed by the internal processor.

8. The method, as set forth in claim 1, wherein the memory device comprises a buffer configured to store operands and results of the operations.

9. A method of operating a memory device, comprising:
sending a request signal from an internal processor to an external processor to request access to a memory array, wherein the internal processor and the memory array are packaged together on the memory device, and wherein the external processor is configured to control access to the memory array; and
receiving a grant signal to grant the internal processor access to the memory array;
wherein the external processor is external to the memory device.

10. The method, as set forth in claim 9, wherein the grant signal is received based on availability of the memory array.

11. The method, as set forth in claim 9, wherein the grant signal is received based on availability of a requested bank in the memory array.

12. A method, as set forth in claim 9, wherein sending the request signal and receiving the grant signal comprise sending the request signal via a control interface operably coupling the external processor and the internal processor, and receiving the grant signal via the control interface.

13. A method, as set forth in claim 9, wherein the external processor comprises a memory controller and the internal processor comprises an arithmetic logic unit (ALU), and wherein sending the request signal and receiving the grant signal comprise sending the request signal via a control interface operably coupling the memory controller and the ALU, and receiving the grant signal via the control interface.

14. A method, as set forth in claim 9, wherein the request signal is sent via a first interface operably coupling the external processor to the internal processor, and the grant signal is received via a second interface operably coupling the memory device and the external processor.

15. The method, as set forth in claim 14, wherein the grant signal comprises an indicator to direct the grant signal to the internal processor.

16. The method, as set forth in claim 9, further comprising granting the internal processor access to a requested bank in the memory array responsive to receiving the grant signal.

17. The method, as set forth in claim 9, wherein the grant signal is based on an order of one or more request signals received by the external processor, wherein one or more request signals are sent by one or more of the internal processor or any other device in a system requesting access to the memory array on the memory device.

18. A method of arbitrating access to a memory device, comprising:

receiving a request signal at an external processor to request access to a memory array on the memory device, wherein the external processor is configured to control access to the memory device; and sending a grant signal from the external processor to grant an internal processor of the memory device access to the memory array.

19. The method, as set forth in claim 18, wherein receiving the request signal and sending the grant signal comprise receiving the request signal via a control interface operably coupling the internal processor and the external processor and sending the grant signal via the control interface.

20. The method, as set forth in claim 19, where the external processor is configured to receive the request signal through the control interface from the internal processor.

21. The method, as set forth in claim 18, wherein the internal processor comprises an arithmetic logic unit (ALU), and wherein receiving the request signal and sending the grant signal comprise receiving the request signal via a control interface operably coupling the external device and the ALU, and sending the grant signal via the control interface, wherein the ALU is embedded on the memory device.

22. The method, as set forth in claim 18, wherein the grant signal is based on an availability of a bank in the requested memory array.

23. The method, as set forth in claim 18, wherein the grant signal is sent based on an availability of the memory array.

24. The method, as set forth in claim 18, wherein the grant signal is sent based on an order of one or more request signals received by the external processor, wherein one or more request signals are sent by one or more of the internal processor or any other device in a system requesting access to the memory array on the memory device.

* * * * *